United States Patent
Veeningen et al.

(10) Patent No.: US 11,537,742 B2
(45) Date of Patent: Dec. 27, 2022

(54) SAMPLING FROM A REMOTE DATASET WITH A PRIVATE CRITERION

(71) Applicant: KONINKLIJKE PHILIPS N.V., Eindhoven (NL)

(72) Inventors: Meilof Geert Veeningen, Eindhoven (NL); Peter Petrus van Liesdonk, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 623 days.

(21) Appl. No.: 16/546,380

(22) Filed: Aug. 21, 2019

(65) Prior Publication Data

US 2020/0074110 A1 Mar. 5, 2020

Related U.S. Application Data

(60) Provisional application No. 62/723,585, filed on Aug. 28, 2018.

(51) Int. Cl.
*G06F 21/62* (2013.01)
*G06F 17/18* (2006.01)
(Continued)

(52) U.S. Cl.
CPC ........ *G06F 21/6245* (2013.01); *G06F 16/901* (2019.01); *G06F 17/18* (2013.01); *G06K 9/623* (2013.01)

(58) Field of Classification Search
CPC .... G06F 21/6245; G06F 16/901; G06F 17/18; G06K 9/623

(Continued)

(56) References Cited

U.S. PATENT DOCUMENTS

| 2002/0052827 A1* | 5/2002 | Waelbroeck | G06Q 30/0601 705/26.1 |
| 2012/0143922 A1* | 6/2012 | Rane | G06F 21/6245 707/E17.005 |

(Continued)

FOREIGN PATENT DOCUMENTS

WO 2017187207 A1 11/2017

OTHER PUBLICATIONS

Nair, Divya G., V. P. Binu, and G. Santhosh Kumar. "An effective private data storage and retrieval system using secret sharing scheme based on secure multi-party computation." 2014 International Conference on Data Science & Engineering (ICDSE). IEEE, 2014. (Year: 2014).*

(Continued)

*Primary Examiner* — Syed A Zaidi

(57) ABSTRACT

Some embodiments are directed to a data sampling device for obtaining a sample of records from a remote dataset satisfying a private criterion using multi-party computation. One or more sample providing devices store respective subdatasets of the remote dataset. The data sampling device determine a candidate size for a sample providing device; requests the sample providing device to determine a candidate sample of the candidate size from the subdataset of the sample providing device; perform a multi-party computation with the sample providing device to obtain a set of indices of records from the candidate sample satisfying the private criterion; sample a subset of the set of indices; and obtains from the sample providing device records of the candidate sample corresponding to the subset of the set of indices.

18 Claims, 6 Drawing Sheets

(51) Int. Cl.
*G06F 16/901* (2019.01)
*G06K 9/62* (2022.01)

(58) Field of Classification Search
USPC .......................................................... 726/26
See application file for complete search history.

(56) References Cited

U.S. PATENT DOCUMENTS

| | | | |
|---|---|---|---|
| 2012/0233460 A1* | 9/2012 | Kamara | H04L 9/3218 713/168 |
| 2012/0260348 A1* | 10/2012 | Woodruff | H04L 9/0838 726/28 |
| 2016/0205095 A1* | 7/2016 | Morel | H04L 63/0861 726/6 |
| 2017/0337487 A1* | 11/2017 | Nock | G06N 3/08 |
| 2017/0372201 A1* | 12/2017 | Gupta | G06N 3/0454 |
| 2018/0349636 A1* | 12/2018 | Bhowmick | H04L 67/02 |
| 2019/0361842 A1* | 11/2019 | Wood | H04L 9/0637 |

OTHER PUBLICATIONS

Pettai, Martin, and Peeter Laud. "Combining differential privacy and secure multiparty computation." Proceedings of the 31st Annual Computer Security Applications Conference. 2015. (Year: 2015).*
NPL Search Terms (Year: 2022).*
Lin, et al., "Differential Privacy Preserving in Big Data Analytics for Connected Health", J Med Syst (2016) 40:97, pp. 1-9.
Dimitrakakis, et al., "Bayesian Differential Privacy through Posterior Sampling", Journal of Machine Learning Research 16 (2016), pp. 1-38.
Damgard, et al., "Multiparty Computation from Somewhat homomorphic Encryption". In Advances in Cryptology CRYPTO 2012, pp. 1-46.
Ishai, et al., "Extending Oblivious Transfers Efficiently", in Advances in Cryptology—CRYPTO 2003, pp. 145-161.
Kiss, et al., "Valiant's universal circuit is practical", Proceedings, Part I, of the 35th Annual International Conference on Advances in Cryptology—EUROCRYPT 2016, pp. 1-29.
Lindell, et al., "A proof of security of yao's protocol for two-party computation", J Cryptology, 22(2):Jun. 26, 2006, pp. 1-25.

* cited by examiner

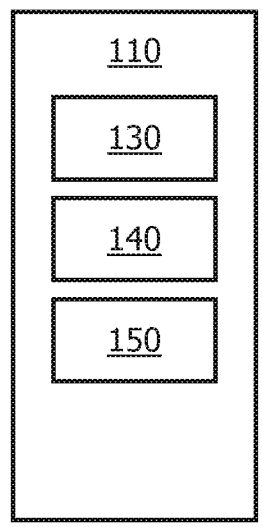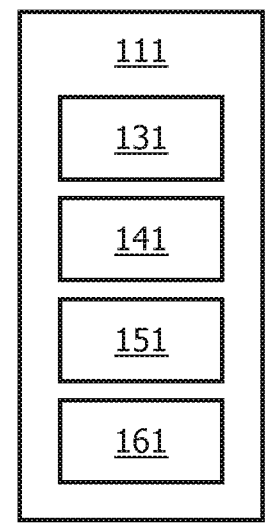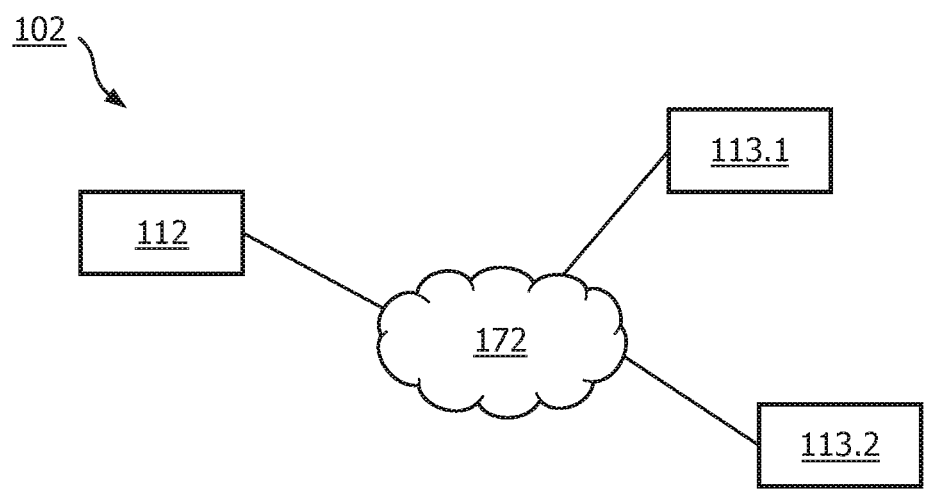

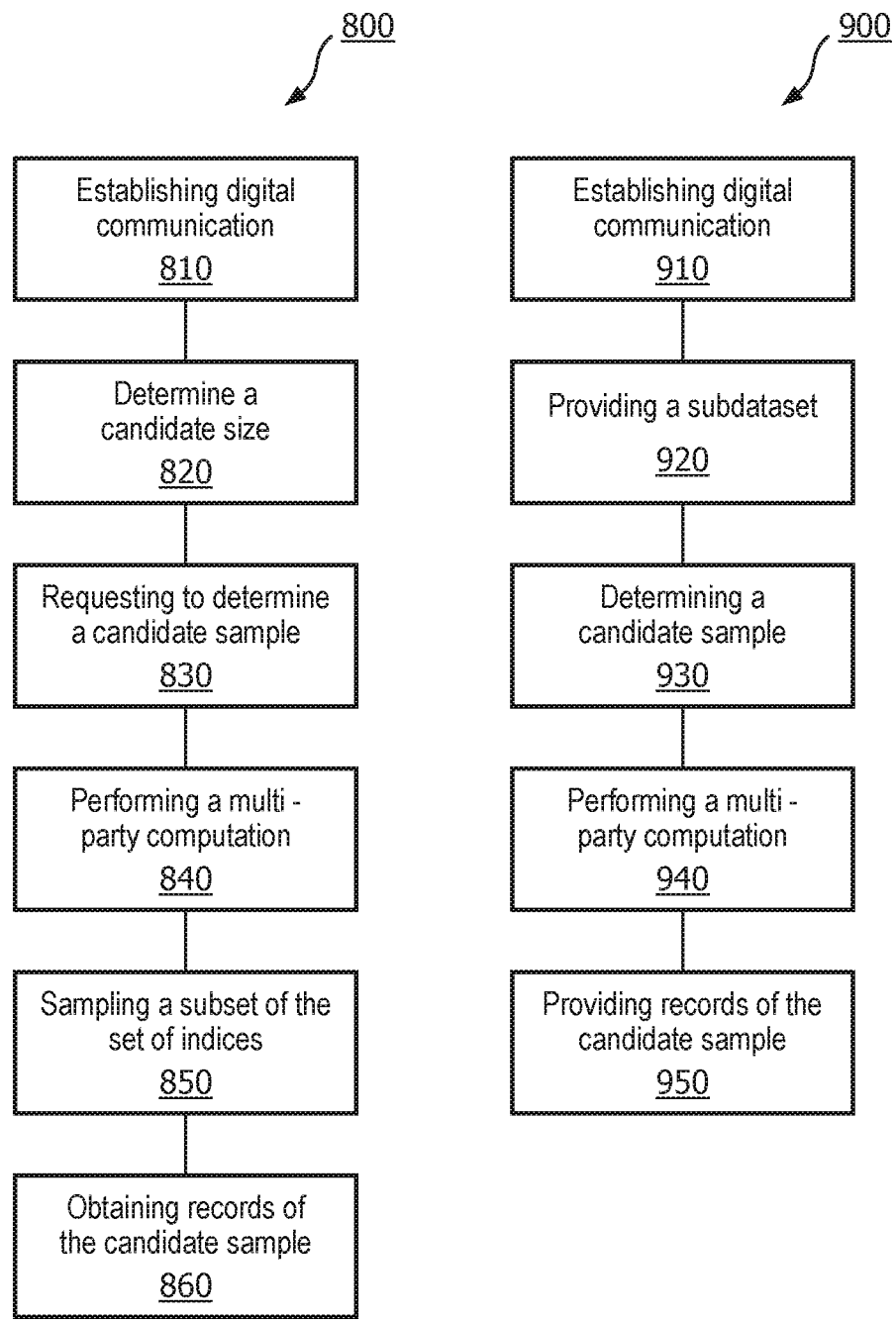

SAMPLING FROM A REMOTE DATASET WITH A PRIVATE CRITERION

RELATED APPLICATION

This application claims priority to and the benefit of U.S. Provisional Application Ser. No. 62/723,585, filed Aug. 28, 2018, which is incorporated by reference herein in its entirety.

FIELD OF THE INVENTION

The invention relates to a data sampling device, a sample providing device, a data sampling method, a sample providing method, and a computer-readable medium.

BACKGROUND

In various settings, it is useful to obtain records from a remote dataset, for example, a remote dataset that is distributed among multiple parties. For example, to perform statistical research on medical data, researchers frequently need data from remote sources, e.g., patient data from multiple hospitals. Similarly, to perform statistical research on the financial situation of a particular business sector, researchers may use data about companies in a sector from multiple banks. To obtain such data, it is useful to randomly sample data from a combined dataset comprising data from multiple sources, e.g., hospitals or banks, according to a certain criterion, e.g., patients suffering from a particular medical condition or companies of a given type.

A known technique for random sampling is rejection sampling, e.g., as known from Wikipedia, The Free Encyclopedia, "Rejection sampling", incorporated herein by reference. For example, in order to sample a random point within the unit circle using rejection sampling, a candidate point is chosen with coordinates independent uniformly distributed between −1 and 1; if the point is within the unit circle, it is accepted, otherwise, the point is rejected and another candidate is generated.

SUMMARY OF THE INVENTION

A disadvantage of applying sampling, e.g., rejection sampling, in the setting of remote datasets is that it does not allow to properly deal with sensitivity of data. For example, if rejection sampling according to a criterion were to be performed by one or more data providers on behalf of a researcher, the researcher would be required to disclose the criterion to the one or more data providers. Particularly in the earlier stages of the research for which the dataset is needed, e.g., medical research, it would be beneficial for researchers to obtain a sample without having to disclose the criterion to the data providers. Namely, this criterion can give information about the direction of the research that the researcher may like to keep private while the research is ongoing. On the other hand, if rejection sample were to be performed by the researcher himself, he would need access to information in addition to the dataset he obtains in the end, e.g., records for which the criterion does not hold and/or information he only needs for checking the criterion. Data providers may want to keep such information private, e.g. in order to minimize data leakage risks for their data subjects, or to be able to charge money for their data.

Hence, it would be beneficial to provide an efficient solution for sampling records from a remote dataset satisfying a criterion that reduces the amount of information that needs to be disclosed about the criterion according to which records should be sampled and/or about the records of the remote dataset.

To better address one or more of these concerns, a data sampling device and a sample providing device are proposed as defined in the claims. The data sampling device is for obtaining a sample of records from a remote dataset satisfying a private criterion, e.g., a criterion that should remain at least partially hidden to sample providing devices. Sample providing devices are for providing the sample to the data sampling device. One or more sample providing devices store respective subdatasets of the remote dataset.

In order to reduce the amount of information that the data sampling device needs to disclose about the private criterion and/or that the sample providing device needs to disclose about the records, use is made of multi-party computation. Multi-party computation is a known cryptographic technique that allows multiple parties to jointly compute a function over their inputs while keeping these inputs private. Unfortunately, implementing known sampling techniques using multi-party computation may lead to a solution with insufficient performance, e.g., a solution in which the computation performed using multi-party computation scales in the size of the subdataset of the sample providing device.

Interestingly, however, the data sampling device and the sample providing device make use of a candidate sample that is smaller than the subdataset. The sample providing device determines a candidate size for the subdataset, and the data sampling device determines the candidate sample from its subdataset. Now, the sample for the data sampling device can be determined by means of a multi-party computation on the candidate sample, in which the data sampling device obtains a set of indices of records from the candidate sample satisfying the private criterion. The data sampling device samples a subset of this set of indices, and obtains records of the candidate sample corresponding to the subset of the set of indices.

Because of the use of multi-party computation, at least some information about the criterion remains hidden from the sample providing device while at least some data from the subdataset that is used to check the criterion remains hidden from the data sampling device. At the same time, because of the use of the candidate sample, computations, in particular multi-party computations, scaling in the size of the subdataset are avoided, thereby reducing the amount of communication and/or computation needed.

In an embodiment, there are multiple sample providing devices, allowing sampling of distributed remote datasets.

In an embodiment, the data sampling device determines the candidate size from a total candidate size such that a sample of records of the remote dataset with size equal to the total candidate size is likely to contain at least a target number of records satisfying the private criterion according to a probability distribution. As a consequence, the data sampling is likely to result in a sample of the target number of records. In an embodiment, the total candidate size is determined from an initial sample obtained using a multi-party computation, which may increase the reliability of the computation of the candidate size and make it less likely that the resulting dataset is too small or the sampling performed on more records than necessary.

In an embodiment, computing the candidate size and sampling the subset of the set of indices is based on an index sample of indices of records of the remote dataset. Sampling the subset of the set of indices may comprise iteratively selecting a subdataset corresponding to an index of the index sample and, if the selected subdataset is the subdataset of the sample providing device, selecting an index of a record from the candidate sample and adding the record to the subset if the selected index is in the set of indices. This may result in a sample of the remote dataset that is statistically similar to a sample obtained using standard rejection sampling.

In an embodiment, the multi-party computation to obtain the set of indices of records from the candidate sample satisfying the private criterion comprises a private function evaluation, a special type of multi-party computation in which the parties compute a function which is a private input of one of the parties. This allows improved hiding of the private criterion.

In an embodiment, the data sampling device obtains the records provided by the sample providing device using a multi-party computation. The subset of the set of indices may be a private input to the multi-party computation of the data sampling device, and records of the candidate sample may be private inputs to the multi-party computation of the sample providing device, allowing the set of transferred records to remain hidden from the sample providing device, allowing improved hiding of the private criterion.

In an embodiment, at least one attribute used for evaluating the private criterion on a record is not obtained by the data sampling device. This way, the data sampling device may receive records sampled according to a private criterion without needing to learn the values of attributes needed to evaluate the criterion.

In an embodiment, if a number of obtained records is smaller than a target number of records, the data sampling device repeats one or more of the determining, the requesting, the performing, the sampling, and the obtaining. The sample providing device, at a further request of the data sampling device, determine a further candidate sample of a further candidate size from its subdataset, the further candidate sample being disjoint from the candidate sample. This way, if the original sampling did not provide sufficient records, additional records can be obtained.

The data sampling device and the sample providing device are electronic devices; they may be computers. The data sampling method and sample providing method described herein may be applied in a wide range of practical applications. Such practical applications include medical and/or financial research, manufacturing, or any other setting where sampling is used.

Further aspects of the invention are a data sampling method and a sample providing method. Embodiments of the data sampling method and/or sample providing method may be implemented on a computer as a computer implemented method, or in dedicated hardware, or in a combination of both. Executable code for an embodiment of either method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all the steps of an embodiment of the data sampling method or sample providing method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a data sampling device, FIG. 1b schematically shows an example of an embodiment of a sample providing device, FIG. 1c schematically shows an example of an embodiment of a data sampling system, FIG. 2a schematically shows an example of an embodiment of a data sampling device, FIG. 2b schematically shows an example of an embodiment of a data sampling device, FIG. 3a schematically shows an example of an embodiment of a data sampling device, FIG. 3b schematically shows an example of an embodiment of a data sampling device, FIG. 4 schematically shows an example of an embodiment of a sample providing device, FIG. 5a schematically shows an example of an embodiment of a data sampling method, FIG. 5b schematically shows an example of an embodiment of a sample providing method, FIG. 6a schematically shows a computer readable medium having a writable part comprising a computer program according to an embodiment, FIG. 6b schematically shows an exemplary hardware diagram for implementing a device according to an embodiment.

LIST OF REFERENCE NUMERALS 102 a data sampling system
110, 112 a data sampling device
111, 113.1, 113.2a sample providing device
130, 131 a processor
140, 141 a memory
150, 151 a communication interface
161 a storage
172 a computer network
210, 210' a data sampling device
231, 231' a sizing unit
232, 232' a requesting unit
233, 233' an MPC unit
234 a sampling unit
235 an obtaining unit
241, 241' a candidate size
242, 242' a subdataset
243 a candidate sample
243' an initial sample
244 a set of indices
245 a subset of the set of indices
246.1, 246.2 a record of the candidate sample
247 an initial size
248 a number of records from the initial sample
249 a total candidate size
310, 310' a data sampling device 331 a sizing unit
333 an MPC unit
334 a sampling unit
335 an obtaining unit
341 a candidate size
342, 342' a subdataset
343, 343' a candidate sample
344, 344' a set of indices
345, 345' a subset of the set of indices
346.1, 346.1' a record
347 an index sample
348 a total candidate size
349.1 a first set of attributes
349.2, 349.2' a second set of attributes
349.3 an attribute
411 a sample providing device
432 a sampling unit
433 an MPC unit
435 a providing unit
441 a candidate size
442 a subdataset
443 a candidate sample
444 a set of indices of records
445 a subset of the set of indices
446.1, 446.2 a record of the candidate sample
800 a data sampling method
810 establishing digital communication
820 determining a candidate size
830 requesting to determine a candidate sample
840 performing a multi-party computation
850 sampling a subset of the set of indices
860 obtaining records of the candidate sample
900 a sample providing method
910 establishing digital communication
920 providing a subdataset
930 determining a candidate sample
940 performing a multi-party computation
950 providing records of the candidate sample
1000 a computer readable medium
1010 a writable part
1020 a computer program
1100 a data sampling device or a sample providing device
1110 a system bus
1120 a processor
1130 a memory
1140 a user interface
1150 a communication interface
1160 a storage
1161 an operating system
1162, 1163, 1164 instructions

DETAILED DESCRIPTION OF THE EMBODIMENTS

Figure 2A:
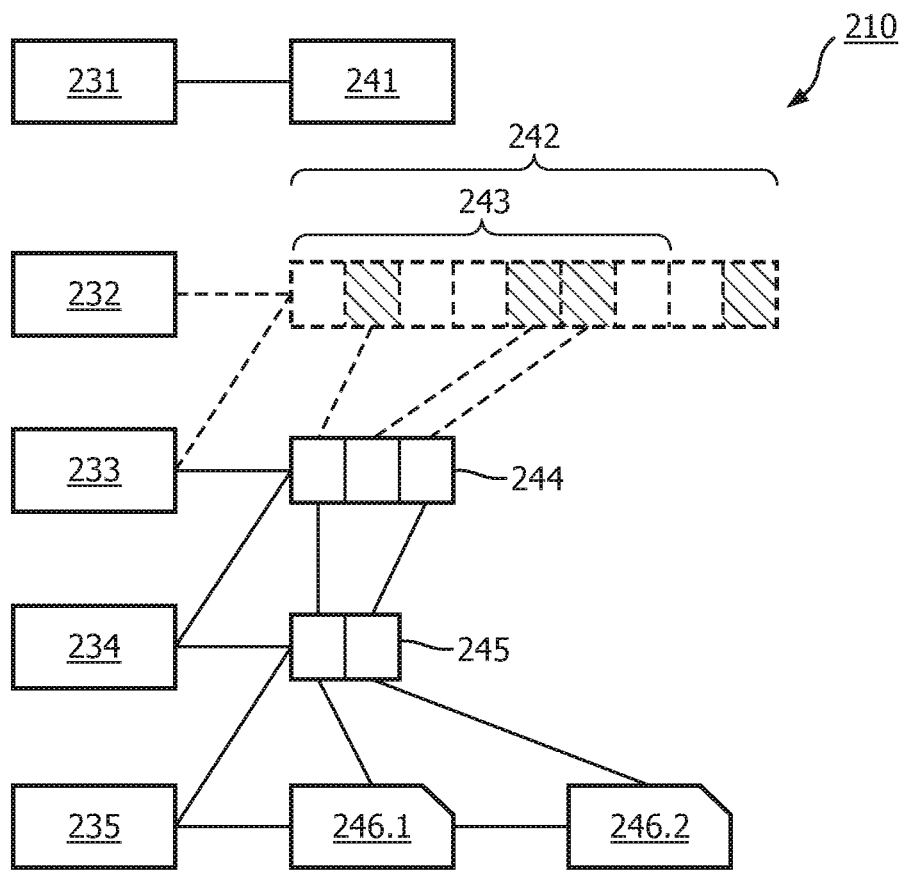

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a schematically shows an example of an embodiment of a data sampling device 110. Data sampling device 110 shown in FIG. 1a comprises a processor 130, a memory 140, and a communication interface 150. For example, memory 140 may comprise software and/or data on which processor 130 is configured to act. Processor 130 may be implemented as one or more processor circuits, e.g., microprocessors, ASICs, FPGAs, and the like. The processor may be provisioned, e.g., within a cloud computing architecture, etc. Further examples are shown herein. Memory 140 may comprise computer program instructions which are executable by processor 130. Processor 130, possibly together with memory 140, is configured according to an embodiment of a data sampling device.

FIG. 1b schematically shows an example of an embodiment of a sampling providing device 111. Sample providing device 111 shown in FIG. 1b comprises a processor 131, a memory 141, a communication interface 151, and a storage 161. For example, memory 141 may comprise software and/or data on which processor 131 is configured to act. Processor 131 may be implemented as one or more processor circuits, e.g., microprocessors, ASICs, FPGAs, and the like. The processor may be provisioned, e.g., within a cloud computing architecture, etc. Further examples are shown herein. Memory 141 may comprise computer program instructions which are executable by processor 131. Processor 131, possibly together with memory 141, is configured according to an embodiment of a sample providing device. Storage 161 may be implemented as a memory, e.g., storage 161 is part of memory 151, as a locally stored database, and/or as an external database. For example, storage 161 comprises an interfacing storage that connects to an external database, e.g., in cloud storage. For example, when a record is needed, the interfacing storage may be asked for it, after which it may be retrieved, e.g., from the external database. The latter may be transparent to the rest of device 111.

A data sampling device and one or more sample providing devices, e.g., multiple sample providing devices, may be combined to form a data sampling system.

FIG. 1c schematically shows an example of an embodiment of a data sampling system 102 comprising data sampling device 112 and sample providing devices 113.1 and 113.2. Although two sample providing devices are shown, other numbers of sample providing devices are also possible, e.g., one, at least three, or at least ten. For example, data sampling device 112 may be data sampling device 110 and sample providing device 113.1 and/or sample providing device 113.2 may be sample providing device 111. Data sampling device 112 is for obtaining a sample of records from a remote dataset satisfying a private criterion using multi-party computation, e.g. a criterion private with respect a sample providing device, e.g., at least some information about the private criterion should remain unknown to at least one sample providing device. One or more sample providing devices store respective subdatasets of the remote dataset. For example, storages of respective sample providing devices, e.g. storage 161 of sample providing device 111, may be configured to store subdatasets of the remote dataset. At least one of the sample providing devices, e.g., sample providing device 113.1 or 113.2, is for providing to data sampling device 112 the sample of records from the remote dataset satisfying the private criterion using multi-party computation. The use of multi-party computation may allow the private criterion of data sampling device 112 and/or the exact set of records obtained from the subdatabase of a sample providing device to remain hidden from the sample providing device, e.g. sample providing device 113.1 or 113.2, and/or records other than those obtained in the sample to remain hidden from data sampling device 112.

In some embodiments, all sample providing devices use multi-party computation to provide to data sampling device 112 the sample of records from the remote dataset satisfying the private criterion, e.g., according to embodiments described herein.

In some embodiments, not all sample providing devices in data sampling system 102 use multi-party computation; for example, the data sampling system may comprise at least one sample providing device, e.g., sample providing device 113.1, that uses multi-party computation according to an embodiment, e.g., such that the private criterion is not disclosed to said sample providing device; and at least one sample providing device, e.g., sample providing device 113.2, that does not use multi-party computation, e.g., where the private criterion is disclosed to said sample providing device. For example, data sampling device 112 may be configured to use multi-party computation with sample providing devices that are less trusted, e.g., sample providing devices residing outside of a trusted perimeter of data sampling device 112, while not using multi-party computation with sample providing devices that are more trusted, e.g., sample providing devices residing inside a trusted perimeter of data sampling device 112.

The various devices of data sampling system 102 may communicate with each other over a computer network 172. The computer network may be an internet, an intranet, a LAN, a WLAN, etc. Computer network 172 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of data sampling system 102 as needed. For example, the connection interface may comprise a connector, e.g., a wired connector, e.g., an Ethernet connector, or a wireless connector, e.g., an antenna, e.g., a Wi-Fi, 4G or 5G antenna. For example, data sampling device 112 may comprise communication interface 150 of data sampling device 110 and sample providing device 113.1 and/or sample providing device 113.2 may comprise communication interface 151 of sample providing device 111. Computer network 172 may comprise additional elements, e.g., a router, a hub, etc.

Various figures, e.g., FIG. 2a, 2b, 3a, 3b, 4, described below show functional units that may be functional units of processors. For example, FIG. 2a may be used as a blueprint of a possible functional organization of the processor. The processors are not shown separate from the units in the figures but are shown in devices 110, 111, in FIG. 1a-FIG. 1b. For example, the functional units shown in FIG. 2a, 2b, 3a, 3b, or 4 may be wholly or partially implemented in computer instructions that are stored at device 110, e.g., in an electronic memory of device 110, and are executable by a microprocessor of device 110, and similarly for device 111. In hybrid embodiments, functional units are implemented partially in hardware, e.g., as coprocessors, e.g., crypto processors, and partially in software stored and executed on device 110 and/or 111.

FIG. 2a schematically shows an example of an embodiment of a data sampling device 210. As pointed out above, FIG. 2a shows functional units which may be implemented by the processor, e.g., processor 130 of data sampling device 110. FIG. 2a also shows some data elements for the purpose of explication.

Data sampling device 210 is for obtaining a sample of records from a remote dataset satisfying a private criterion using multi-party computation. Data sampling device 210 may comprise a sizing unit 231 configured to determine a candidate size 241 for a sample providing device, the candidate size being smaller than the size of subdataset 242 of the sample providing device. Data sampling device 210 may comprise a requesting unit 232 configured to request the sample providing device to determine a candidate sample 243 of candidate size 241 from subdataset 242 of the sample providing device. Data sampling device 210 may comprise an MPC unit 233 configured to perform a multi-party computation with the sample providing device to obtain a set of indices 244 of records from the candidate sample satisfying the private criterion. Data sampling device 210 may comprise a sampling unit 234 configured to sample a subset 245 of set of indices 244. Data sampling unit 210 may comprise an obtaining unit 235 configured to obtain from the sample providing device records 246.1, 246.2 of the candidate sample corresponding to subset 245 of the set of indices.

For example, the remote dataset may comprise one or more records, each record comprising one or more attributes, for example, an attribute of a record may comprise a text, a numerical value, an image, a document, or any other kind of data. A set of attribute types of the dataset may be known to data sampling device 210, e.g., wherein each record has an attribute value for each attribute type in the set of attributes types. One or more sample providing devices store respective subdatasets of the remote dataset. For example, a sample providing device from the set of sample providing devices may store a subdataset comprising one or more records of the dataset. The sample to be obtained by data sampling device 210 may be a subset of the set of records of the remote dataset, e.g., the sample may comprise respective subsets of respective subdatasets of the remote dataset.

In an embodiment, the remote dataset is itself a subdataset of a larger dataset. For example, the remote dataset is obtained from the larger dataset by filtering and/or sampling. For example, data sampling device 210 is configured to request the one or more sample providing devices to obtain respective subdatasets of the remote dataset from respective subdatasets of the larger dataset, the sample providing devices being configured to obtain the respective subdatasets upon a request by the data sampling device. For example, the remote dataset comprises records of the larger dataset satisfying a public criterion, data sampling device 210 providing the public criterion to one or more sample providing devices and the sample providing devices obtaining their subdatasets from subdatasets of the larger dataset by filtering based on the public criterion, e.g., by selecting all records of their subdatasets of the larger dataset that satisfy the public criterion.

The size of the remote dataset and/or sizes of subdatasets of the remote dataset may be known to data sampling device 210, e.g., data sampling device 210 may be configured to obtain a size of a subdataset of a sample providing device, e.g., to request and receive the size of the subdataset from the sample providing device. The private criterion may be any kind of criterion indicative of records of the remote dataset that data sampling device 210 aims to receive, various examples of which are described herein. The multiparty computation may be any multi-party computation, e.g., any secure multi-party computation protocol, e.g., a protocol that allows data sampling device 210 and a sample providing device to perform a joint computation on respective sensitive inputs wherein neither device needs to disclose its sensitive inputs to the other device, various examples of which are described herein.

Data sampling device 210 may comprise a sizing unit 231. Sizing unit 231 may determine a candidate size 241 for a sample providing device. The candidate size may be smaller than the size of subdataset 242 of the sample providing device; interestingly, this may allow operations performed by units of data sampling device 210 such as MPC unit 233 to scale in the candidate size as opposed to the size of the subdataset, thus reducing communication and/or computation complexity. Various ways of determining candidate size 241 are possible, e.g., sizing unit 231 may determine candidate size 241 to be a constant, e.g., a hardcoded constant, e.g., 1, at least or at most 10 or at least or at most 100; a fixed percentage of the size of subdataset 242, e.g., at least or at 10% or at least or at most 50%; or a randomly chosen value, e.g., a random value in a predetermined interval, e.g., between 1 and 100.

In an embodiment, sizing unit 231 determines candidate size 241 for the sample providing device based on a total candidate size, e.g., a total candidate size for all sample providing devices combined, e.g., sizing unit 231 determines a total candidate size and determines candidate size 241 for the sample providing device therefrom. For example, sizing unit 231 may determine the total candidate size to be a constant, a fixed percentage of the size of the remote dataset, or randomly. Sizing unit 231 may determine candidate size 241 for the sample providing device from the total candidate size in proportion to the size of its subdataset, e.g., sizing unit 231 may determine candidate size 241 to be the total candidate size multiplied by the proportion of the size of the subdataset to the size of the remote dataset. Sizing unit 231 may also determine candidate size 241 in a randomized way, e.g., based on the total candidate size. In an embodiment, sizing unit 231 uses a total candidate size of 1, randomly selects a sample providing device, and sets candidate size 241 for a sample providing device to 1 if it is the randomly selected sample providing device and to 0 otherwise.

In an embodiment, sizing unit 231 determines the total candidate size such that a sample of records of the remote dataset with size equal to the total candidate size is likely to contain at least a target number of records satisfying the private criterion according to a probability distribution. For example, the probability that a sample of records of the remote dataset with size equal to the candidate size contains at least a target number of records satisfying the private criterion may be higher than a given threshold, e.g., a threshold of at least or at most 90% or 99%. The target number of records may be an intended number of records to be obtained by data sampling device 210, e.g., as input by a user. For example, the target number of records may be one, at least two, at least ten, etcetera. Sizing unit 231 may obtain an estimate S of how many items from the remote dataset satisfy the private criterion and determine the total candidate size therefrom. For example, sizing unit 231 may determine the total candidate size by multiplying the target number of records by the size of the remote dataset divided by the estimate S in order to obtain an expected number of needed records, and apply a safety margin to obtain the total candidate size, e.g., by multiplying the number of needed records by a certain factor, e.g., a factor at least 1.1 or a factor at least or at most 2. For example, the total candidate size may be a conservative upper bound on the number of records that need to be sampled from the remote dataset such that the number of records in the remote dataset satisfying the private criterion is at least the target number of records. For example, given estimate S, remote dataset size N, total candidate size N', and target number of records M, a probability p that a sample of total candidate size N' comprises fewer than the target number of records M may be computed as:

$$p = \sum_{i=0}^{M-1} \frac{\binom{S}{i}\binom{N-S}{N'-i}}{\binom{N}{n'}};$$

sizing unit 231 may determine total candidate size N' such that this chance is sufficiently small, e.g., smaller than a given percentage, e.g., at least or at most 1% or at least or at most 5%, for example, by increasing N' until p is sufficiently small. For example, for N=5000, S=1000, and M=10, sizing unit 231 may choose N'=89 such that p<0.01.

Figure 2B:
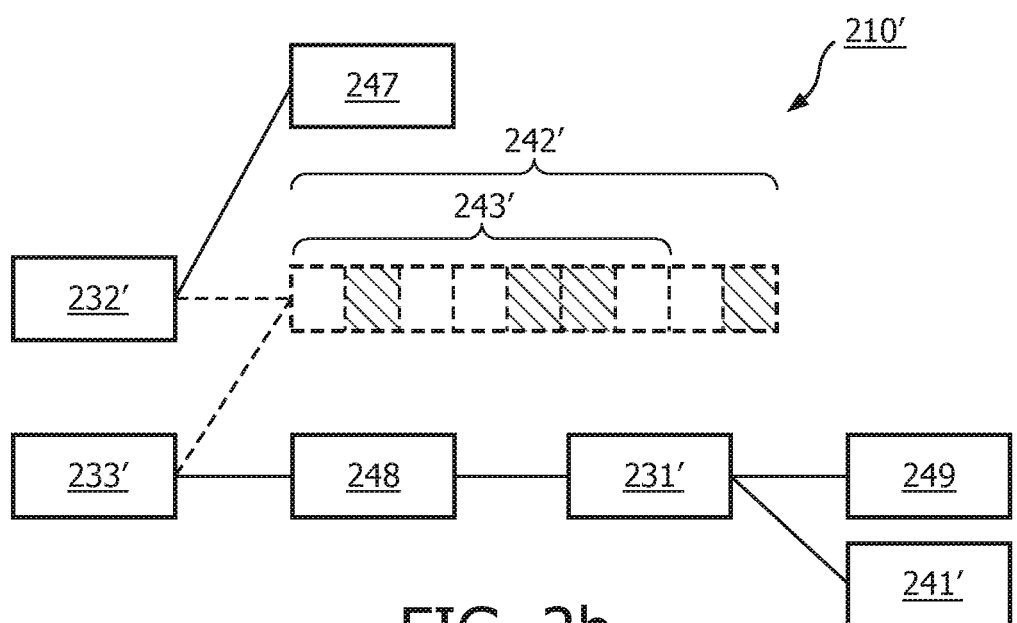

FIG. 2b schematically shows an example of an embodiment of a data sampling device 210'. Data sampling device 210' may comprise a sizing unit 231', a requesting unit 232', and/or an MPC unit 233'. Sizing unit 231' may determine total candidate size 249 by having requesting unit 232' request a sample providing device to determine an initial sample 243' of initial size 247 from subdataset 242' of the sample providing device; having MPC unit 233' perform a multi-party computation with the sample providing device to obtain a number of records 248 from the initial sample satisfying the private criterion; and determining total candidate size 249 at least in part based on the number of records 248 from the initial sample satisfying the private criterion. Sizing unit 231' may directly determine candidate size 249 for the sample providing device instead of deriving it from total candidate size 249.

Records of subdataset 242' are shown with dashed lines in FIG. 2b to denote that these records are typically not stored in the plain at data sampling device 210', e.g., the records may not be stored at data sampling device 210' or the records or portions of the records may be stored in a secret-shared way, e.g., for use by MPC unit 233'. Moreover, data sampling device 210' does not generally know which records of subdataset 242' have been selected for initial sample 243', e.g., data sampling device 210' may refer with respect to the sample providing device to records of initial sample 243' with indices 0, 1, 2, etc., with the sample providing device translating these indices of the initial sample to indices of subdataset 242'. Initial size 247 may for example be a fixed value, e.g., at least or at most 10, at least or at most 100 or at least or at most 1000; or a fixed proportion of the size of the remote dataset or the subdataset of the sample providing device, e.g., at least or at most 1% or at least or at most 10%, or based on an initial estimate of how many items from the subdataset satisfy the private criterion. Generally, the initial size is smaller than the candidate size and/or total candidate size, e.g., to limit the overhead of interactively determining the total candidate size. Requesting unit 232' and/or MPC unit 233' may be adapted from requesting unit 232 and MPC unit 233 respectively to determine number of records 248.

Based on number of records 248 from the initial sample satisfying the private criterion, e.g., obtained by MPC unit 233', sizing unit 231' may obtain an estimate Si of how many items from the subdataset satisfy the private criterion, e.g., by multiplying the number of records 248 by the size of the subdataset divided by the size of the initial sample, for example, sizing unit 231 may determine that 10 out of 200 records of an initial sample from a subdataset of 1000 records satisfy the private criterion and determine estimate Si=10*(1000/200)=50 therefrom. Sizing unit 231 may determine such estimates Si for each subdataset and determine estimate S of how many items from the remote dataset satisfy the private criterion from the Si, e.g., by computing a sum of estimates Si. Sizing unit 231' may then determine total candidate size 249 from S, for example as described above. Sizing unit 231' may also determine estimate S directly from number of records 248 from the initial sample satisfying the private criterion, e.g. by multiplying this number by the size of the remote dataset divided by the size of the initial sample, e.g., sizing unit 231 may determine that 10 out of 200 records of an initial sample from a remote dataset of 10000 records satisfy the private criterion and determine estimate S=10*(10000/200)=500 therefrom. Sizing unit 231' may compute candidate size 241' from total candidate size 249, for example as described above.

Figure 3A:
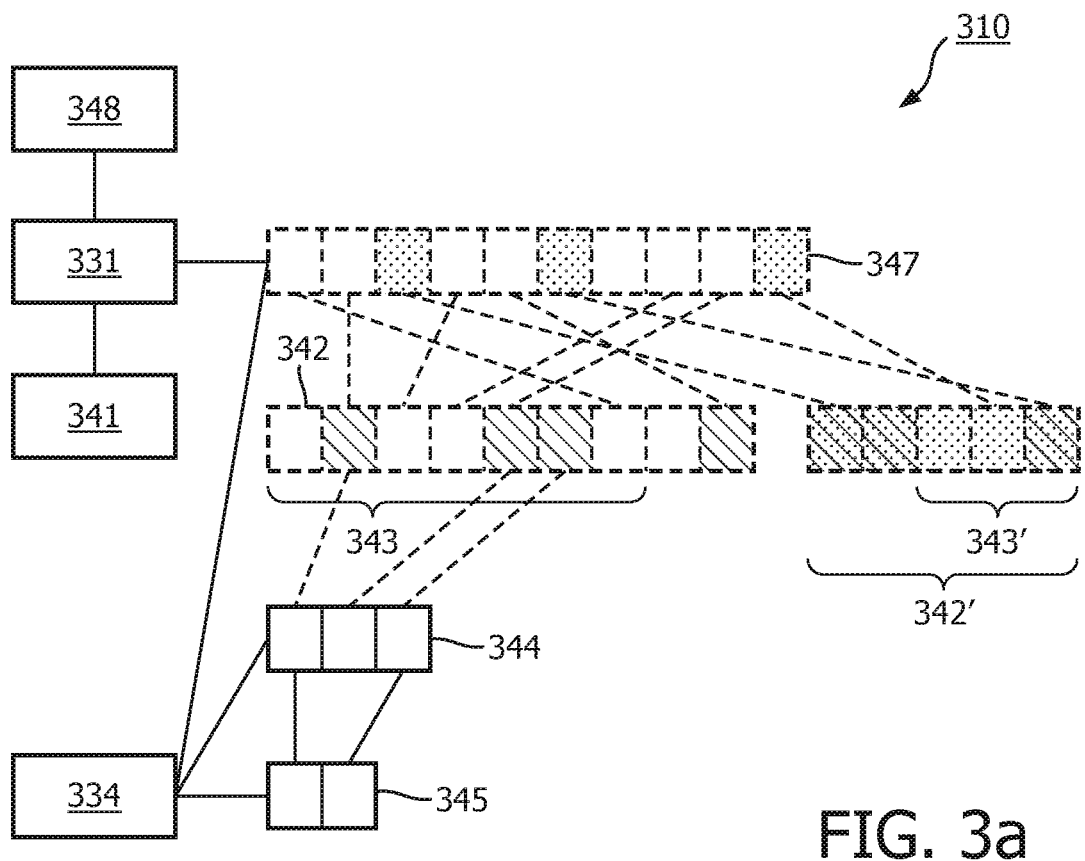

FIG. 3a schematically shows an example of an embodiment of a data sampling device 310. Data sampling device 310 may comprise a sizing unit 331. Sizing unit 331 may determine candidate size 341 from total candidate size 348, e.g., a total candidate size determined as described above. To this end, sizing unit 331 may sample an index sample 347 of indices of records of the remote dataset. By way of example, in FIG. 3a, two subdatasets 342, 342' of the remote dataset are shown, subdataset 342 comprising nine records and subdataset 342' comprising five records. Records of the subdatasets are shown in FIG. 3a with dashed lines to indicate that the records are stored, e.g., at respective sample providing devices, but are generally not available in the plain to data sampling device 310, e.g., the records or portions of the records may only be available in secret-shared form, e.g., for use by an MPC unit of the data sampling device, or they may not be available to the data sampling device 310 at all.

Index sample 347 may be a sample of indices of records of the remote dataset with size equal to total candidate size 348. By way of example, in FIG. 3a, a sample of indices of size 10 is shown, dotted lines indicating records from the remote datasets that respective indices point to. For example, the first index of index sample 347 in FIG. 3a points to the seventh record of subdataset 342, the second index points to the second record of subdataset 342, the third index points to the first record of subdataset 342', and so on. Indices with a white background point to records of subdataset 342, e.g., the first index and the second index of index sample 347, whereas indices with a grey background point to records of subdataset 342', e.g., the third index of index sample 347. Sizing unit 331 may determine index sample 347 using standard sampling techniques such as rejection sampling and/or inversion sampling.

Sizing unit 331 may determine candidate size 341 by counting a number of indices in index sample 347 corresponding to subdataset 342 of the sample providing device. For example, sizing unit 331 may determine an interval of indices corresponding to records from the subdataset and count the number of indices that are in the interval. For example, for index sample 347 shown in FIG. 3a, sizing unit 331 may set candidate size 341 of subdataset 342 to seven since index sample 347 comprises seven indices pointing to records from subdataset 342. Determining candidate size 341 as described here may have the advantage that the candidate size 341 for subdataset 342 matches that of a random sample from the remote dataset, and/or that index set 347 may be re-used later, e.g., by sampling unit 334 of data sampling device 310, where the use of candidate size 310 matching index set 347 may guarantee that sufficient elements from the subdataset are available for use by sampling unit 334.

Returning to FIG. 2a, data sampling device 210 may comprise a requesting unit 232 configured to request the sample providing device to determine a candidate sample of candidate size 241 from subdataset 242 of the sample providing device. By way of example, a subdataset 242 is shown in FIG. 2a comprising nine records. Dashed lines for subdataset 242 in FIG. 2a may indicate that it is not generally available in the plain to data sampling device 210, e.g., records or portions or records may be available to data sampling device 210, e.g., for use by MPC unit 233, or they may not be available to data sampling device 210 at all. A record of subdataset 242 in FIG. 2a being filled with diagonal lines may indicate that it satisfies the private criterion, e.g., by way of example, the second, fifth, sixth, and ninth records shown in FIG. 2a satisfy the private criterion.

For example, requesting unit 232 may send a request message to the sample providing device using its communication interface. Requesting unit 232 may not need to send the request if candidate size 241 is zero, for example, in an embodiment candidate size 241 for the sample providing device is equal to zero or one, requesting unit 232 being configured to send a request to sample a candidate record to the sample providing device if candidate size 241 is equal to one.

Upon being requested to do so, the sample providing device may determine candidate sample 243 of candidate size 241. For presentational purposes only, FIG. 2a shows a candidate sample comprising the first seven records of subdataset 242, but generally, candidate sample 243 is a random subset, e.g., not comprising only adjacent elements. For instance, any subset of subdataset 242 of candidate size 241 may be chosen with equal probability, as detailed in later embodiments of sample providing devices. Data sampling device 210 does not generally learn which records of subdataset 242 are comprised in candidate sample 243, e.g., data sampling device 210 may refer with respect to the sample providing device to records of candidate sample 243 with indices 0, 1, 2, etc., the sample providing device translating these indices of records of the candidate sample 243 to indices of records of subdataset 242. This may have the advantage that the data sampling device does not learn indices that can be used to link different records, e.g. obtained in different samples, to each other, hence improving privacy and/or protection of sensitive records.

Data sampling device 210 may further comprise an MPC unit 233 configured to perform a multi-party computation with the sample providing device to obtain a set of indices 244 of records from candidate sample 243 satisfying the private criterion. Various multi-party computation techniques may be used that allow data sampling device 210 and the sample providing device to perform a joint computation on respective secret inputs. The private criterion may be a private input of data sampling device 210. The records from candidate sample 243, or portions of those records based on which the private criterion can be evaluated, may be private inputs of the sample providing device. Typically, the set of indices 244, or information from which the set of indices can be determined by data sampling device 210, is a private output for data sampling device 210. For example, private outputs for data sampling device 210 may comprise a bit vector of length equal to candidate sample 243, a bit of the bit vector indicating whether a record of the candidate sample satisfies the private criterion. For example, in FIG. 2a, set of indices 244 may comprise indices of the second, fifth, and sixth records of candidate sample 243 satisfying the private criterion, as indicated by the dashed lines.

For instance, the multi-party computation may comprise an execution of the SPDZ protocol as detailed in Ivan Damgård, Valerio Pastro, Nigel P. Smart, Sarah Zakarias, "Multiparty Computation from Somewhat Homomorphic Encryption", Proceedings of CRYPTO 2012 (incorporated herein by reference), or any of its variants known in the state of the art. Parties of the multi-party computation may comprise the data sampling device 210 and the sample providing device. The multi-party computation may also comprise additional parties, e.g., parties that do not deliver private inputs to the computation themselves, e.g. one or more other sample providing devices, one or more other data sampling devices, and/or one or more external parties. Adding at least one party apart from data sampling device 210 and the sample providing device may have the advantage of allowing more efficient and/or secure MPC protocol to be used, e.g., MPC protocols in the honest-majority setting and/or MPC protocols satisfying a fairness property. In an embodiment, a passively secure 2-party protocol based on garbled circuits is used in which data sampling device 210 acts as garbler and the sample providing device acts as an evaluator. In this case, a passively secure protocol may suffice since data sampling device 210 may learn at most one bit of output for each data record, limiting the amount of information per record that may leak. If the private criterion can be expressed as private parameters to a publicly known algorithm, e.g., as a decision tree for a standard decision tree evaluation algorithm, then a garbled circuits-based protocol may be directly applied to this publicly known algorithm. If the private criterion comprises evaluating a function that itself should be kept secret, then the circuit for evaluating the private criterion may be constructed so that it hides the function, e.g., using known universal circuit techniques.

The multi-party computation may comprise a computation using homomorphic encryption, e.g., additively homomorphic encryption, somewhat homomorphic encryption, or fully homomorphic encryption, e.g., data sampling device 210 may provide a homomorphic input encryption representing its private criterion to the sample providing device; the sample providing device may compute from this a homomorphic output encryption of set of indices 244 and provide it to data sampling device 210; data sampling device 210 may decrypt the output encryption to obtain set 244, or similar with the roles of the data sampling device and the sample providing device exchanged. As another example, the multi-party computation may comprise a predicate encryption, e.g., the data sampling device 210 may provide predicate encryptions of records of candidate sample 243, the data sampling device 210 attempting to decrypt those records using a decryption key corresponding to a predicate matching the private criterion.

Private criteria of various types may be used, with MPC unit 233 configured appropriately to obtain a set of indices 244 of records from candidate sample 243 satisfying the private criterion at hand. In some embodiments, a type of the private criterion is known both to data sampling device 210 and the sample providing device it is communicating with, e.g., it is known that the private criterion comprises checking that an attribute of a record is equal to a certain value, or it is known that, e.g., the private criterion comprises evaluating a decision tree on the record. However, the criterion may be private in the sense that not all information needed to evaluate the criterion is disclosed to the sample providing device, e.g., the exact attribute of a record whose equality to the certain value should be checked, and/or the certain value; or the exact attribute or attributes of a record to be inspected in a particular node of the decision tree. MPC unit 233 may support various types of criteria. The particular criterion, e.g., a combination of criteria, may be selected, e.g., by a user at run-time and/or based on types of criteria supported by the sample providing device. For example, the sample providing device may be configured to provide a set of supported private criteria types, data sampling device 210 selecting a private criterion type from the set of supported private criteria types.

In an embodiment, obtaining the set of indices 244 of records satisfying the private criterion comprises evaluating the private criterion on a first set of attributes of a record. Obtaining unit 235 obtaining records of the candidate sample may comprise obtaining a second set of attributes of the record, at least one attribute from the first set of attributes not being comprised in the second set of attributes. This may have as an advantage that, even for records that satisfy the private criterion, data sampling device 210 does not need to obtain all attributes that are needed to check the private criterion, leading to improved privacy and/or protection of sensitive information.

Depending on the private criterion, MPC unit 233 performs a multi-party computation to obtain set of indices 244. In an embodiment, the multi-party computation comprises iteratively checking whether a record from the candidate sample satisfies the private criterion, a value indicative of whether the record satisfies the private criterion being an output of the iterated computation, e.g., a private output of data sampling device 210. For example, the private criterion may comprise an ith attribute from a set of n attributes, for example, the third record from a set of 10 attributes, of a record being equal to a value v, e.g., v=25. The set of records may comprise all attributes of the record or a subset, e.g., a subset selected by data sampling device 210. Data sampling device 210 may input a value indicative of the index of the attribute to check equality of, e.g., an array $(\delta_1, \ldots, \delta_n)=(0,0,1,0,0,0,0,0,0,0)$, as a private input to the multi-party computation, and a value to check equality to, e.g., v=25. The sample providing device may input attribute values as private inputs to the multi-party computation, e.g., $(v_1, \ldots, v_n)=(\ldots, 24, \ldots)$ where $v_3=24$. The multi-party computation may comprise determining the attribute value to check equality of, e.g., by computing inner product $v'=\Sigma \delta_i v_i = \delta_1 v_1 + \ldots + \delta_n v_n$; and checking equality v=v' using a known equality-checking protocol.

As another example, the private criterion may comprise evaluating a decision tree on a set of attributes of the record. For example, data sampling device 210 may input information about the decision tree, e.g., a value indicative of an index of an attribute to inspect at a node of the decision tree; a comparison operation at the node, e.g. a check that the attribute is equal to a given value, that it is smaller than a given value, etc.; and/or a given value for the node of the decision tree, e.g., a value to compare the attribute to. For example, the "Class" protocol from "Practical secure decision tree learning in a teletreatment application", S. de Hoogh et al., Proceedings of the 18th International Conference on Financial Cryptography, 2014 (incorporated herein by reference), may be used in the multi-party computation to evaluate the decision tree.

In an embodiment, the multi-party computation to obtain set of indices 244 comprises a private function evaluation, a private function of the private function evaluation comprising a function for evaluating the private criterion. For example, the multi-party computation may comprise executing the private function evaluation protocol of "Actively Secure Private Function Evaluation", P. Mohassel et al., Proceedings of ASIACRYPT, 2014 (incorporated herein by reference). This may have as an advantage that the sample providing device learns less information about the private criterion that is evaluated, e.g., it does not learn a type of criterion, e.g., it does not learn that the private criterion comprises an attribute comparison or a decision tree evaluation. Data sampling device 210 may provide the private criterion as a private function for the private function evaluation, whereas the sample providing device may provide a set of attributes of a record, e.g., a subset of attributes of the record, e.g., a subset specified by the data sampling device.

Data sampling device 210 may comprise a sampling unit 234 configured to sample a subset 245 of set of indices 244. For example, shown in FIG. 2a is a subset 245 comprising the first and third index of set of indices 244, corresponding to the second and sixth records of candidate sample 243, respectively. For example, data sampling device 210 may randomly sample a particular number of indices from set of indices 244, e.g., data sampling device 210 determines a target number of records and determines subset 245 of the set of indices 244 as a random sample from set of indices 244 comprising a number of indices corresponding to the target number of records, e.g., using rejection sampling, inversion sampling, and/or other known sampling techniques. Data sampling device may jointly sample subsets 245 of respective sets of indices 244 from multiple sample providing devices, e.g., set of indices 244 is comprised in a joint set of indices from which sampling unit 234 samples a joint subset, e.g., a joint subset of size corresponding to a target number of records, subset 245 of set of indices 244 comprising elements from the joint subset comprised in set of indices 244. For example, the target number of records may be input by a user, may be hardcoded, and/or may be determined based on the size of the set of indices.

In an embodiment, the size of subset 245 of set of indices 244 is determined based on a proportion of indices of records from candidate sample 243 that satisfy the private criterion. For example, the proportion of indices of records from candidate sample 243 that satisfy the private criterion may be used to obtain an estimate of the number of records from subdataset 242 that satisfy the criterion, e.g., by multiplying the proportion by the size of subdataset 242. Sizes of sets of indices of respective subdatasets may be chosen, e.g., proportionally to their estimated number of records satisfying the criterion, for example, in order to obtain a stratified sample of the remote dataset. For example, a target number of indices of each set of indices may be determined, subset 245 of set of indices 244 being sampled as a random subset of size equal to the target number of indices. Items may also be sampled from sets of indices of respective subdatasets, weighted, e.g., by their estimated number of records satisfying the criterion.

Returning to FIG. 3a. As discussed above, in examples of embodiments shown in the figure, sizing unit 341 may determine an index sample 347 of indices of records of the remote dataset, the size of the index sample being total candidate size 348, and/or determine candidate size 341 by counting a number of indices in index sample 347 corresponding to subdataset 342 of the sample providing device. For example, shown is a subdataset 342; index sample 347 shown in the figure comprises ten indices, seven of which point to records from subdataset 342. Also shown is another subdataset 342', e.g., of another sample providing device, three indices of index sample 347 pointing to records from subdataset 342'.

Shown in the figure are also candidate samples 343 of subdataset 342 and 343' of subdataset 342'. By way of example, for presentational purposes, candidate sample 343 shown in the figure comprises the first seven records of subdataset 342 and candidate sample 343' comprises the last three records of subdataset 342'. Furthermore, index set 344 is shown pointing to those elements of subdataset 342, e.g., the second, fifth, and sixth elements of subdataset 342, that satisfy the private criterion, as indicated by the diagonally striped filling pattern. As discussed above, data sampling device 210 does not generally know which records of the subdatasets have been selected for the respective subdatasets, e.g., data sampling device 210 may refer with respect to the sample providing device to records of candidate sample 343 with indices 0, 1, 2, etc., with the sample providing device translating these indices of the candidate sample to indices of its subdataset. As also shown in the figure, items from the index set do not generally point to items from candidate sample 343, e.g., the fifth element of index sample 347 points to the ninth element of subdataset 343 that is not in the candidate sample. However, the number of elements of the index sample 347 pointing to elements of subdataset 342 generally coincides with the size of candidate sample 343. In this example, index set 347 comprises three indices of elements from subdataset 342', e.g., the third, sixth, and tenth indices point to elements from subdataset 342', as indicated by the grey filling of these indices and of the records of subdataset 342'. Although the number of subdatasets shown in the figure is two, it will be understood that other amounts of subdatasets are also possible, e.g., one subdataset or more than two subdatasets, e.g., three or ten.

Data sampling device 310 may comprise a sampling unit 334 that samples subset 345 of set of indices 344 by iteratively selecting a subdataset 342, 342' corresponding to an index of index sample 347 and, if the selected subdataset is subdataset 342 of the sample providing device, selecting an index of a record from candidate sample 343 and adding the index to the subset 345 if the selected index is in set of indices 344. This may result in subsets of respective sets of indices, e.g., subset 345, corresponding to a random sample of the remote dataset satisfying the private criterion, e.g., at least for sufficiently large sets of indices 344. Sampling unit 334 may select the index of the index sample, e.g., linearly, or randomly from indices that have not yet been selected.

For example, sampling unit 334 may start with the first index from set of indices 347, which, in the example of FIG. 3a, points to an element of subdataset 342. Data sampling device 310 may thus select an index of the candidate sample 343 of this subdataset 342. The index may be selected, e.g., randomly among elements of index sample 347 that have not been selected so far, or consecutively. Generally, the index of candidate sample 343 is chosen independently from the index of index sample 347, e.g. data sampling device 310 does not generally know whether or not the item pointed to by the index of the index sample is even comprised in candidate sample 343. For example, data sampling device 310 may randomly select the third record of candidate sample 343. E.g., since this record does not satisfy the private criterion, e.g., it is not comprised by index set 344, this index is not added to subset 345 of the set of indices.

Continuing with the second index from set of indices 347, sampling unit 334 may again select an index from candidate sample 343, e.g., since the second index from index set 347 points to subdatabase 342 comprising candidate sample 343. For example, sampling unit 334 may now select the second element of candidate sample 343. Since this record satisfies the private criterion, e.g., it is comprised by set of indices 344, sampling unit 334 may add this index, e.g., pointing to the second record of the candidate set, to subset 345 of the set of indices. Continuing with the third index from set of indices 347, since this index points to a record of subdatabase 342', sampling unit 334 may not select an index of candidate sample 343 or add an index to subset 345, although it may select an index of candidate sample 343' and possibly add an index to a respective subset of a respective set of indices of candidate sample 343'. Sampling unit 334 may continue in this way to obtain the full subset 345.

Returning to FIG. 2a. Data sampling device 210 may further comprise an obtaining unit 235 configured to obtain from the sample providing device records 246.1, 246.2 of candidate sample 243 corresponding to the subset 245 of the set of indices. In an embodiment, data sampling device 210 sends subset 245 of the set of indices to the sample providing device, which may respond by sending the set of records corresponding to the set of indices.

Figure 3B:
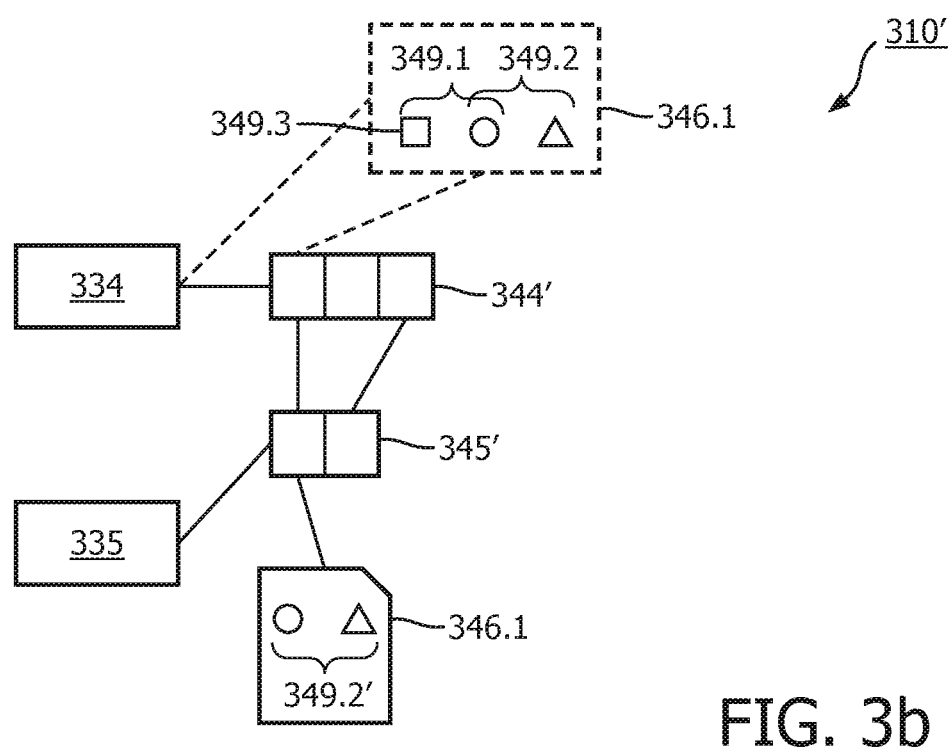

In an embodiment, obtaining unit 235 does not obtain all attributes of records. For example, obtaining unit 235 specifies a subset of desired attributes, e.g., in a query to the sample providing device, and obtains only these attributes. For example, schematically shown in FIG. 3b is an example of an embodiment of a data sampling device 310'. MPC unit 333 of data sampling device 310' performs the multi-party computation to obtain the set of indices 344' of records satisfying the private criterion by evaluating the private criterion on a first set of attributes 349.1 of a record 346.1, 346.1'. Obtaining unit 335 of data sampling device 310' obtains records of the candidate sample corresponding to subset 345' of set of indices 344' by obtaining a second set of attributes 349.2 of the record 346.1, 346.1', at least one attribute 349.3 from the first set of attributes not being comprised in the second set of attributes 349.2. This may have as an advantage that data sampling device may use information for its private criterion, e.g., an attribute 349.3, that it does not obtain, e.g., is not allowed to obtain, e.g. for data privacy and/or data sensitivity reasons.

Returning to FIG. 2a. In an embodiment, obtaining unit 235 performs a multi-party computation with the sample providing device in order to obtain records 246.1, 246.2 corresponding to subset 245 of the set of indices 244. The subset of the set of indices may be a private input to the multi-party computation of data sampling device 210. This may have as an advantage that the sample providing device does not learn which records are obtained, further contributing to keeping the private criterion hidden from the sample providing device. For example, data sampling device 210 may input a vector $(\delta_1, \ldots, \delta_n)$ of length corresponding to candidate size 241, each element of the vector being indicative of whether the element of candidate sample 243 is comprised in set of indices 244. Records of candidate sample 243 may be private inputs to the multi-party computation of the sample providing device, e.g., a set of attributes $a_1, \ldots, a_k$ for each record, e.g., a different subset than that on which the private criterion was evaluated, as discussed above with reference to FIG. 3b. For each record of the candidate sample, the multi-party computation may output the record if it is in the subset of the set of indices, or dummy values otherwise, e.g., the multi-party computation may compute $\delta_i \cdot a_1, \ldots, \delta_i \cdot a_k$ for each record $a_i = (a_1, \ldots, a_k)$ of the candidate sample 243 and output it to data sampling device 210. In an embodiment, the sample providing device obtains as output of the multi-party computation a number of records obtained by the data sampling device, e.g., the value $\delta_1 + \ldots + \delta_n$, e.g., for billing purposes and/or to check that the number of records obtained does not exceed a given threshold, e.g., the computation is terminated before any records are output if the number of records to be obtained exceeds the threshold. In an embodiment, the multi-party computation additionally comprises checking that the subset input by data sampling device 210 is a subset of the set of indices, which may have as an advantage that the data sampling device 210 is not able to obtain records it is not supposed to obtain.

The multi-party computation performed by obtaining unit 235 may use the same multi-party computation protocol instance that was used by MPC unit 233, e.g., a reactive protocol for multi-party computation may be used that allows data sampling device 210 to provide subset 245 of the set of indices as an input to the MPC after receiving set of indices 244 as an output. However, a different instance of a multi-party computation may also be used, e.g., the multi-party computation may use a different multi-party computation protocol, e.g., one with different security properties, e.g., a different threshold, and/or a different set of participating parties than the multi-party computation performed by unit 233. In an embodiment, the multi-party computation performed by obtaining unit 235 is an oblivious transfer, e.g., in order to obtain t records from a candidate sample of n records, a t-out-of-n oblivious transfer protocol may be used.

In an embodiment, if a number of obtained records is smaller than a target number of records, sizing unit 231, requesting unit 232, MPC unit 233, sampling unit 234, and/or obtaining unit 235 of data sampling device 210 repeat at least some of the steps outlined above to obtain further records. For example, it may turn out that the number of records satisfying the private criterion, e.g., the size of set of indices 244 and/or sets of indices with respect to other sample providing devices, comprise fewer than the target number of records. In this case, after sampling unit 234 and/or obtaining unit 235 obtain records from this candidate sample and respective candidate samples of other sample providing devices, the sampling process may be restarted with sizing unit 231 determining a further candidate size, requesting unit 232 requesting a further candidate sample, etcetera. Alternatively, prior to sampling unit 234 and/or obtaining unit 235 being activated, sizing unit 231, requesting unit 232 and/or MPC unit 233 may first process an additional set of records, sampling unit 234 and/or obtaining unit 235 processing both obtained sets of indices. In either case, sampling unit 231 may determine a new estimate of the number of records in the remote dataset and/or its subdatasets that satisfy the private criterion based on the sizes of respective sets of indices 244 and based a further candidate size thereon. Requesting unit 232 may request the sample providing device to determine a further candidate sample from its subdataset, the sample providing device selecting further records from its subdataset, e.g., records not in candidate sample 243, to determine its further candidate sample. MPC unit 233 may perform a multi-party computation to determine a set of indices of records from the further candidate sample, e.g., by evaluating the private criterion on records of the further candidate sample. If the overall number of obtained records or indices is still smaller than the target number of records, the steps of the various units may again be repeated, e.g., up to a predefined maximum number of steps, or until a sufficient number of records is obtained, or it is determined that the remote dataset does not contain the target number of records satisfying the private criterion.

Figure 4:
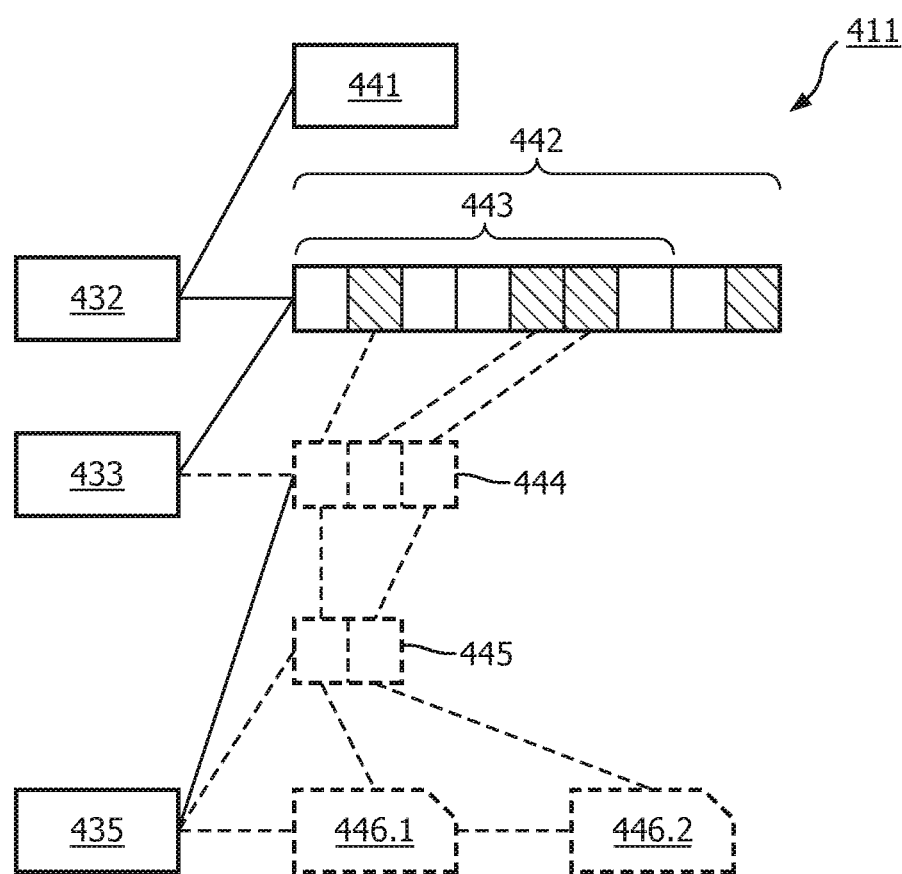

FIG. 4 schematically shows an example of an embodiment of a sample providing device 411. Sample providing device 411 is for providing to a data sampling device a sample of records from a remote dataset satisfying a private criterion using multi-party computation. Sample providing device is configured to store a subdataset 442 of the remote dataset. By way of example, FIG. 4 shows a subdataset 442 comprising nine records, four of which satisfy the private criterion, as indicated by the diagonally striped pattern. Sample providing device 411 does not generally know which records of subdataset 442 satisfy the private criterion. Examples of remote datasets and subsets are discussed above with reference to FIG. 2a.

Sample providing device 411 may comprise a sampling unit 432 configured to determine, at a request of the data sampling device, a candidate sample 443 of a candidate size 441 from subdataset 442. Candidate size 441 may be smaller than the size of subdataset 442. Sample providing device 411 may further comprise an MPC unit 433 configured to perform a multi-party computation with the data sampling device to let the data sampling device obtain a set of indices 444 of records from the sample 443 satisfying the private criterion. Sample providing device 411 may further comprise a providing unit configured to provide to the data sampling device records 446.1, 446.2 of candidate sample 443 corresponding to a subset 445 of the set of indices 444 sampled by the data sampling device.

Sampling unit 432 may determine candidate sample 443 of candidate size 441 at a request of the data sampling device. For example, sampling unit 432 may receive the request specifying the candidate size 441, or it may receive a request to determine candidate sample, the candidate size being fixed, e.g., in an embodiment, the candidate size is fixed as one. Candidate size 441 is typically smaller than the size of the subdataset, e.g., sampling unit 432 may be configured to check that candidate size 441 does not exceed a preconfigured threshold, e.g., a maximum number of records, e.g., a maximum of at least or at most 100 or 1000 records, or a maximum percentage of the subdataset, e.g., a maximum percentage of at least or at most 10% or 25% of the subdataset. Sampling unit 432 typically selects records of candidate sample 443 randomly from subdataset 442, e.g., using existing sampling methods such as rejection sampling or inversion sampling. Shown in the figure is a candidate sample 443 of candidate size seven comprising the first seven records of subdataset 442, but the records being adjacent to each other is for presentational purposes only, e.g., in general, the records will be randomly selected from the subdataset. Sampling unit 432 may keep a translation table for translating indices of the candidate sample 443 to indices of the subdataset 442, e.g., the data sampling device may use subsequent indices 0, 1, 2, etc. to refer to particular entries of the candidate sample, which sample providing device 411 translates to indices of subdataset 442 by means of the translation table.

Sample providing device 411 may further comprise an MPC unit 433 to perform a multi-party computation with the data sampling device to let the data sampling device obtain a set of indices 444 of records from candidate sample 443 satisfying the private criterion. Various examples of MPC protocols to perform this task were discussed with reference to MPC unit 233 of data sampling device 210. The set of indices 444 is shown in FIG. 4 using dashed lines to indicate that sample providing device 411 typically does not learn the set of indices, e.g., it stores the set of indices only in secret-shared form, or not at all. Sample providing device 411 typically does not learn the size of set 444. In an embodiment, the multi-party computation to obtain the set of indices 444 of records from candidate sample 443 satisfying the private criterion comprises a private function evaluation, a private function of the private function evaluation comprising a function for evaluating the private criterion.

Sample providing device 411 may further comprise a providing unit 435 configured to provide to the data sampling device records 446.1, 446.2 of candidate sample 443 corresponding to a subset 445 of the set of indices 444 sampled by the data sampling device. For example, the data sampling device may send subset 445 of indices to sample providing device 411, that may respond by sending the set of records corresponding to the set of indices, e.g., by translating indices of candidate sample 443 to indices of subdataset 442, retrieving the records corresponding to the set of translated indices, and sending them. Sample providing device 411 does not necessarily send all attributes of records; for instance, in an embodiment, performing the multi-party computation to let the data sampling device obtain the set of indices 444 of records satisfying the private criterion comprises evaluating the private criterion on a first set of attributes of a record, and providing records 446.1, 446.2 of the candidate sample comprises providing a second set of attributes of the record, at least one attribute from the first set of attributes not being comprised in the second set of attributes.

In an embodiment, providing unit 435 provides to the data sampling device records corresponding to subset 445 of the set of indices by performing a multi-party computation with the sample providing device, the subset 445 of the set of indices being a private input to the multi-party computation of the data sampling device, records 446.1, 446.2 of the candidate sample being private inputs to the multi-party computation of sample providing device 441. Subset 445 and records 446.1, 446.2 are indicated with dashed lines in FIG. 4 to indicate that, in such embodiments, sample providing device 411 does not typically learn which records it provides. In an embodiment, the multi-party computation by providing unit 435 to provide records corresponding to the subset is an oblivious transfer.

In an embodiment, sample providing device 411 obtains as output of the multi-party computation a number of records obtained by the data sampling device, e.g., for billing purposes and/or to check that the number of records obtained does not exceed a given threshold, e.g., the multi-party computation is terminated before any records are output if the number of records to be obtained exceeds the threshold. In an embodiment, the multi-party computation additionally comprises checking that the subset 445 input by the data sampling device is a subset of the computed set of indices 444, which may have as an advantage that the data sampling device is not able to obtain records it is not supposed to obtain.

In an embodiment, sample providing device 411 is configured to, at a further request of the data sampling device, determine a further candidate sample of a further candidate size from subdataset 442, the further candidate sample being disjoint from candidate sample 443. For example, candidate sample 443 did not contain sufficient records satisfying the private criterion. In such cases, sampling unit 432, MPC unit 433, and/or providing unit 435 may be configured to repeat at least some of their operations in order to provide additional records to the data sampling device. For instance, after the computation to let the data sampling device obtain set of indices 444, sample providing device 411 may receive the further request; sampling unit 432 may determine a further candidate sample, e.g., disjoint from candidate sample 443; MPC unit 433 may perform a multi-party computation to let the data sampling device obtain a set of indices of further records from the further candidate sample satisfying the criterion; and providing unit 435 may provide records of both the candidate sample 443 and the further candidate sample corresponding to respective subsets of indices of candidate sample 443 and the further candidate sample. Alternatively, providing unit 435 may first provide records from the candidate sample 443, after which the steps performed by sampling unit 432, MPC unit 433, and providing unit 435 are all repeated in order to provide records of the further candidate sample. These steps may be repeated, e.g., up to a predefined maximum number of steps, until a sufficient number of records are provided, or until all records of subdataset 442 have been processed. In any case, MPC unit 433 may check that the total number of records sampled from subdataset 442 does not satisfy a threshold, e.g., a predefined maximum number of records or a predefined maximum percentage of records of subdataset 442.

In the various embodiments of the data sampling device and sample providing device, the communication interface may be selected from various alternatives. For example, the interface may be a network interface to a local or wide area network, e.g., the Internet, a storage interface to an internal or external data storage, a keyboard, an application interface (API), etc.

The data sampling device and the sample providing device may have a user interface, which may include well-known elements such as one or more buttons, a keyboard, display, touch screen, etc. The respective devices device may also have user interfaces. The user interface may be arranged for accommodating user interaction for performing a data sampling.

Storage 161 may be implemented as an electronic memory, say a flash memory, or magnetic memory, say hard disk or the like. Storage 161 may comprise multiple discrete memories together making up storage 161. Storage 161 may also be a temporary memory, say a RAM. In the case of a temporary storage 161, storage 161 contains some means to obtain data before use, say by obtaining them over an optional network connection (not shown).

Typically, the data sampling device and the sample providing device each comprise a microprocessor which executes appropriate software stored at the data sampling device and the data providing device; for example, that software may have been downloaded and/or stored in a corresponding memory, e.g., a volatile memory such as RAM or a non-volatile memory such as Flash. The respective devices may also be equipped with microprocessors and memories. Alternatively, the respective devices may, in whole or in part, be implemented in programmable logic, e.g., as field-programmable gate array (FPGA). The respective devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, the data sampling device comprises a sizing circuit, a requesting circuit, an MPC circuit, a sampling circuit, and an obtaining circuit. In an embodiment, the sample providing device comprises a sampling circuit, an MPC circuit, and a providing circuit. The circuits implement the corresponding units described herein. The circuits may be a processor circuit and storage circuit, the processor circuit executing instructions represented electronically in the storage circuits. The circuits may also be, FPGA, ASIC or the like.

The processor may be a processor circuit implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

FIG. 5*a* shows an example of an embodiment of a data sampling method 800. Data sampling method 800 is for obtaining a sample of records from a remote dataset satisfying a private criterion using multi-party computation. One or more sample providing devices store respective subdatasets of the remote dataset. Data sampling method 800 comprises:
- establishing 810 digital communication with a sample providing device from the one or more sample providing devices,
- determining 820 a candidate size for the sample providing device, the candidate size being smaller than the size of the subdataset of the sample providing device,
- requesting 830 the sample providing device to determine a candidate sample of the candidate size from the subdataset of the sample providing device,
- performing 840 a multi-party computation with the sample providing device to obtain a set of indices of records from the candidate sample satisfying the private criterion,
- sampling 850 a subset of the set of indices,
- obtaining 860 from the sample providing device records of the candidate sample corresponding to the subset of the set of indices and store the records in a memory.

FIG. 5*b* shows an example of an embodiment of a sample providing method 900. Sample providing method 900 is for providing to a data sampling device a sample of records from a remote dataset satisfying a private criterion using multi-party computation. Sample providing method 900 comprises:
- establishing 910 digital communication with the data sampling device,
- providing 920 a subdataset of the remote dataset,
- determining 930, at a request of the data sampling device, a candidate sample of a candidate size from the subdataset, the candidate size being smaller than the size of the subdataset,
- performing 940 a multi-party computation with the data sampling device to let the data sampling device obtain a set of indices of records from the candidate sample satisfying the private criterion,
- providing 950 to the data sampling device records of the candidate sample corresponding to a subset of the set of indices sampled by the data sampling device.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 850 and 860 of data sampling method 800 may be executed, at least partially, in parallel. Moreover, a given step may not have finished completely before a next step is started.

Embodiments of the methods may be executed using software, which comprises instructions for causing a processor system to perform method 800 or 900. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiments of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6A:
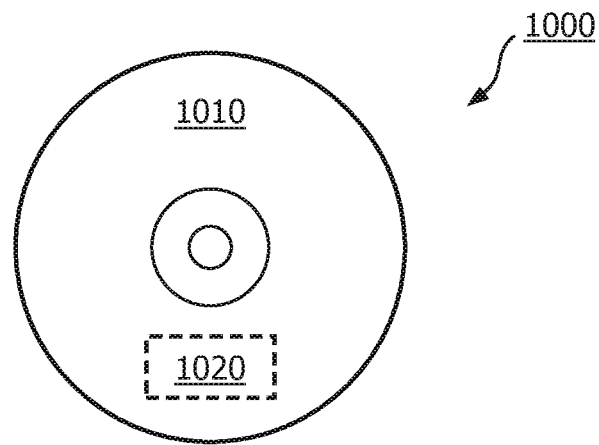

FIG. 6a shows a computer readable medium 1000 having a writable part 1010 comprising a computer program 1020, the computer program 1020 comprising instructions for causing a processor system to perform a data sampling method and/or a sample providing method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said data sampling and/or sample providing method.

Figure 6B:
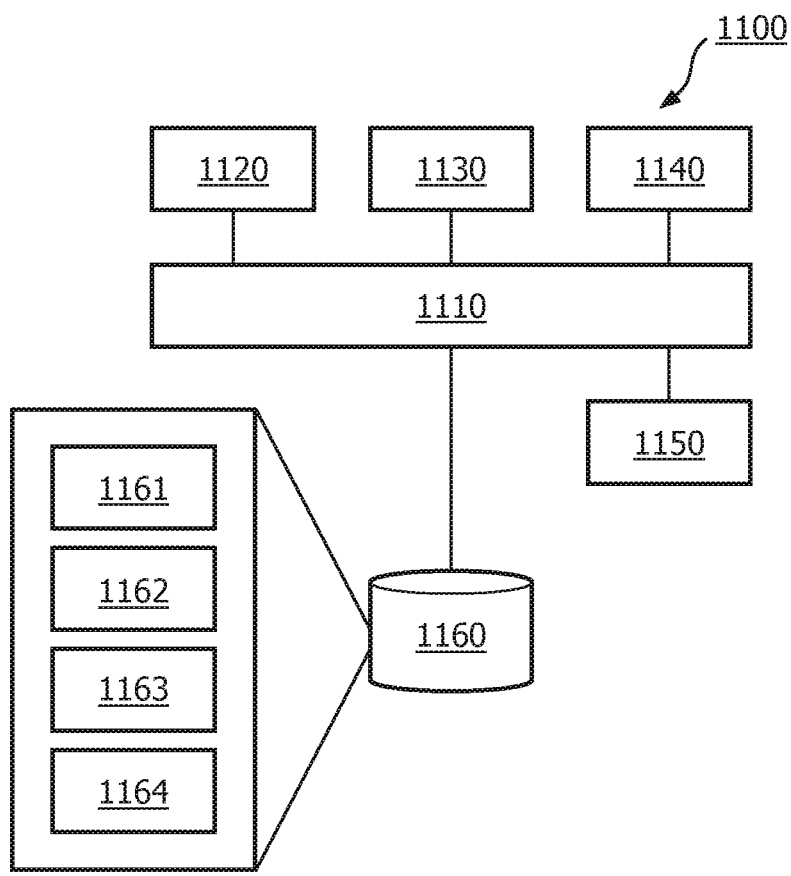

FIG. 6b illustrates an exemplary hardware diagram 1100 for implementing a data sampling device or a sample providing device. The exemplary hardware 1100 may correspond to one or more data sampling devices of FIG. 1a or one or more sample providing devices of FIG. 1b. As shown, the device 1100 includes a processor 1120, memory 1130, user interface 1140, communication interface 1150, and storage 1160 interconnected via one or more system buses 1110. It will be understood that this figure constitutes, in some respects, an abstraction and that the actual organization of the components of the device 1100 may be more complex than illustrated.

The processor 1120 may be any hardware device capable of executing instructions stored in memory 1130 or storage 1160 or otherwise processing data. As such, the processor may include a microprocessor, field programmable gate array (FPGA), application-specific integrated circuit (ASIC), or other similar devices. For example, the processor may be an Intel Core i7 processor, ARM Cortex-R8, etc. In an embodiment, the processor may be ARM Cortex M0.

The memory 1130 may include various memories such as, for example L1, L2, or L3 cache or system memory. As such, the memory 1130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1140 may include one or more devices for enabling communication with a user such as an administrator. For example, the user interface 1140 may include a display, a mouse, and a keyboard for receiving user commands. In some embodiments, the user interface 1140 may include a command line interface or graphical user interface that may be presented to a remote terminal via the communication interface 1150.

The communication interface 1150 may include one or more devices for enabling communication with other hardware devices. For example, the communication interface 1150 may include a network interface card (NIC) configured to communicate according to the Ethernet protocol. For example, the communication interface 1150 may comprise an antenna, connectors or both, and the like. Additionally, the communication interface 1150 may implement a TCP/IP stack for communication according to the TCP/IP protocols. Various alternative or additional hardware or configurations for the communication interface 1150 will be apparent.

The storage 1160 may include one or more machine-readable storage media such as read-only memory (ROM), random-access memory (RAM), magnetic disk storage media, optical storage media, flash-memory devices, or similar storage media. In various embodiments, the storage 1160 may store instructions for execution by the processor 1120 or data upon with the processor 1120 may operate. For example, the storage 1160 may store a base operating system 1161 for controlling various basic operations of the hardware 1100. For example, the storage may store instructions 1162 for a data sampling device to determining a candidate size, instructions 1163 to request a sample providing device to determine a candidate sample, and/or instructions 1164 to perform a multi-party computation with a sample providing device, etcetera. Or, the storage may store instructions 1162 for a sample providing device to determine a candidate sample, instructions 1163 to perform a multi-party computation with a data sampling device, and/or instructions 1164 to provide records of the candidate sample, etcetera.

It will be apparent that various information described as stored in the storage 1160 may be additionally or alternatively stored in the memory 1130. In this respect, the memory 1130 may also be considered to constitute a "storage device" and the storage 1160 may be considered a "memory." Various other arrangements will be apparent. Further, the memory 1130 and storage 1160 may both be considered to be "non-transitory machine-readable media." As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein.

Further, where the device 1100 is implemented in a cloud computing system, the various hardware components may belong to separate physical systems. For example, the processor 1120 may include a first processor in a first server and a second processor in a second server.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A data sampling system for obtaining a sample of records from a remote dataset satisfying a private criterion using multi-party computation, the data sampling system comprising a data sampling device and a plurality of sample providing devices, each of the plurality of sample providing devices storing a respective subdataset of the remote dataset, the data sampling device comprising:
    a communication interface configured for digital communication with at least one of the plurality of sample providing devices; and
    a processor configured to:
        determine a candidate size for the sample providing device, the candidate size being smaller than the size of the subdataset of the sample providing device;
        request the sample providing device determine a candidate sample of the candidate size from the subdataset of the sample providing device;
        perform a multi-party computation with the sample providing device to obtain a set of indices of records from the candidate sample satisfying the private criterion, wherein the multi-party computation comprises a private function evaluation, a private function of the private function evaluation comprising a function for evaluating the private criterion;
        sample a subset of the set of indices; and
        obtain from the sample providing device records of the candidate sample corresponding to the subset of the set of indices.

2. A data sampling device as in claim 1, the processor being further configured to determine a total candidate size such that a sample of records of the remote dataset with size equal to the total candidate size is likely to contain at least a target number of records satisfying the private criterion according to a probability distribution, the candidate size for the sample providing device being determined from the total candidate size.

3. A data sampling device as in claim 2, wherein determining the total candidate size comprises:
    requesting the sample providing device to determine an initial sample of an initial size from the subdataset of the sample providing device;
    performing a multi-party computation with the sample providing device to obtain a number of records from the initial sample satisfying the private criterion; and
    determining the total candidate size at least in part based on the number of records from the initial sample satisfying the private criterion.

4. A data sampling device as in claim 2, wherein determining the candidate size from the total candidate size comprises:
    sampling an index sample of indices of records of the remote dataset, the size of the index sample being the total candidate size, and counting a number of indices in the index sample corresponding to the subdataset of the sample providing device; and
    sampling the subset of the set of indices comprises iteratively selecting a subdataset corresponding to an index of the index sample and, if the selected subdataset is the subdataset of the sample providing device, selecting an index of a record from the candidate sample and adding the record to the subset if the selected index is in the set of indices.

5. A data sampling device as in claim 1, wherein obtaining from the sample providing device records corresponding to the subset of the set of indices comprises performing a multi-party computation with the sample providing device, the subset of the set of indices being a private input to the multi-party computation of the data sampling device, records of the candidate sample being private inputs to the multi-party computation of the sample providing device.

6. A data sampling device as in claim 5, wherein the multi-party computation to obtain records corresponding to the subset is an oblivious transfer.

7. A data sampling device as in claim 5, wherein the multi-party computation to obtain records corresponding to the subset additionally comprises checking that the subset input by the data sampling device is a subset of the set of indices.

8. A data sampling device as in claim 1, wherein performing the multi-party computation to obtain the set of indices of records satisfying the private criterion comprises evaluating the private criterion on a first set of attributes of a record and obtaining records of the candidate sample comprises obtaining a second set of attributes of the record, at least one attribute from the first set of attributes not being comprised in the second set of attributes.

9. A data sampling device as in claim 1, wherein the size of the subset of the set of indices is determined based on a proportion of indices of records from the candidate sample that satisfy the private criterion.

10. A data sampling device as in claim 1, wherein the processor is further configured to, if a number of obtained records is smaller than a target number of records, repeat one or more of the determining, the requesting, the performing, the sampling, and the obtaining.

11. A sample providing device for providing to a data sampling device a sample of records from a remote dataset satisfying a private criterion using multi-party computation, the sample providing device comprising:
    a communication interface configured for digital communication with the data sampling device;
    a storage configured to store a subdataset of the remote dataset; and a processor configured to:
  determine, at a request of the data sampling device, a candidate sample of a candidate size from the subdataset, the candidate size being smaller than the size of the subdataset;
  perform a multi-party computation with the data sampling device to let the data sampling device obtain a set of indices of records from the candidate sample satisfying the private criterion, wherein the multi-party computation comprises a private function evaluation, a private function of the private function evaluation comprising a function for evaluating the private criterion; and
  provide to the data sampling device records of the candidate sample corresponding to a subset of the set of indices sampled by the data sampling device.

12. A sample providing device as in claim 11, wherein the processor is configured to, at a further request of the data sampling device, determine a further candidate sample of a further candidate size from the subdataset, the further candidate sample being disjoint from the candidate sample.

13. A data sampling method for obtaining a sample of records from a remote dataset satisfying a private criterion using multi-party computation, one or more sample providing devices storing respective subdatasets of the remote dataset, the data sampling method comprising:
  establishing digital communication with a sample providing device from the one or more sample providing devices;
  determining a candidate size for the sample providing device, the candidate size being smaller than the size of the subdataset of the sample providing device;
  requesting the sample providing device to determine a candidate sample of the candidate size from the subdataset of the sample providing device;
  performing a multi-party computation with the sample providing device to obtain a set of indices of records from the candidate sample satisfying the private criterion, wherein the multi-party computation comprises a private function evaluation, a private function of the private function evaluation comprising a function for evaluating the private criterion;
  sampling a subset of the set of indices; and
  obtaining from the sample providing device records of the candidate sample corresponding to the subset of the set of indices and store the records in a memory.

14. A data sampling method as in claim 13, wherein the one or more sample providing devices comprise multiple sample providing devices.

15. A sample providing method for providing to a data sampling device a sample of records from a remote dataset satisfying a private criterion using multi-party computation, the sample providing method comprising:
  establishing digital communication with the data sampling device;
  providing a subdataset of the remote dataset;
  determining, at a request of the data sampling device, a candidate sample of a candidate size from the subdataset, the candidate size being smaller than the size of the subdataset;
  performing a multi-party computation with the data sampling device to let the data sampling device obtain a set of indices of records from the candidate sample satisfying the private criterion, wherein the multi-party computation comprises a private function evaluation, a private function of the private function evaluation comprising a function for evaluating the private criterion; and
  providing to the data sampling device records of the candidate sample corresponding to a subset of the set of indices sampled by the data sampling device.

16. A non-transitory computer-readable medium comprising data representing instructions to cause a processor system to perform a data sampling method for obtaining a sample of records from a remote dataset satisfying a private criterion using multi-party computation, one or more sample providing devices storing respective subdatasets of the remote dataset, the data sampling method comprising:
  establishing digital communication with a sample providing device from the one or more sample providing devices;
  determining a candidate size for the sample providing device, the candidate size being smaller than the size of the subdataset of the sample providing device;
  requesting the sample providing device to determine a candidate sample of the candidate size from the subdataset of the sample providing device;
  performing a multi-party computation with the sample providing device to obtain a set of indices of records from the candidate sample satisfying the private criterion, wherein the multi-party computation comprises a private function evaluation, a private function of the private function evaluation comprising a function for evaluating the private criterion;
  sampling a subset of the set of indices; and
  obtaining from the sample providing device records of the candidate sample corresponding to the subset of the set of indices and store the records in a memory.

17. A non-transitory computer-readable medium as in claim 16, wherein the one or more sample providing devices comprise multiple sample providing devices.

18. A non-transitory computer-readable medium comprising transitory or non-transitory data representing instructions to cause a processor system to perform a sample providing method for providing to a data sampling device a sample of records from a remote dataset satisfying a private criterion using multi-party computation, the sample providing method comprising:
  establishing digital communication with the data sampling device;
  providing a subdataset of the remote dataset;
  determining, at a request of the data sampling device, a candidate sample of a candidate size from the subdataset, the candidate size being smaller than the size of the subdataset;
  performing a multi-party computation with the data sampling device to let the data sampling device obtain a set of indices of records from the candidate sample satisfying the private criterion, wherein the multi-party computation comprises a private function evaluation, a private function of the private function evaluation comprising a function for evaluating the private criterion; and
  providing to the data sampling device records of the candidate sample corresponding to a subset of the set of indices sampled by the data sampling device.

* * * * *